E. BUGATTI.
COMBINATION BRAKE AND SHOCK ABSORBER.
APPLICATION FILED JUNE 1, 1914.

1,117,972.

Patented Nov. 24, 1914.

2 SHEETS—SHEET 1.

Witnesses
H. F. Schilling
Hermann Heurich

Inventor
Ettore Bugatti
by
his attorney

E. BUGATTI.
COMBINATION BRAKE AND SHOCK ABSORBER.
APPLICATION FILED JUNE 1, 1914.
1,117,972.
Patented Nov. 24, 1914.
2 SHEETS—SHEET 2.
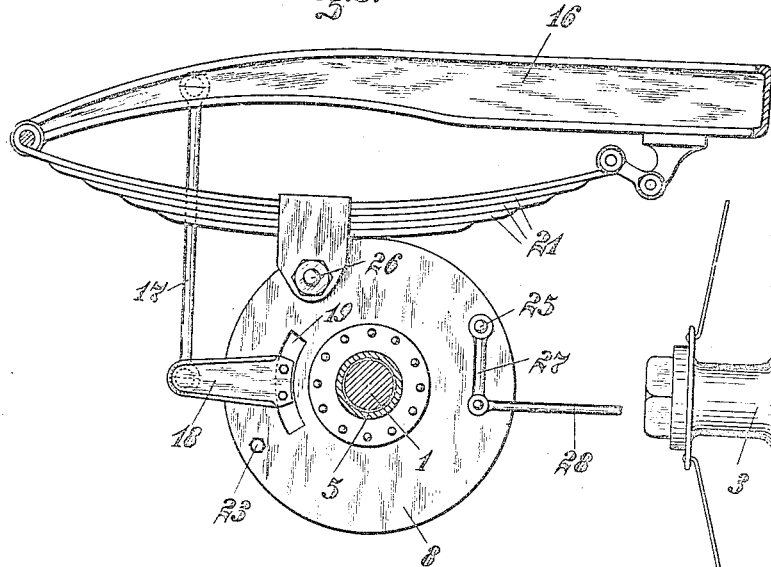
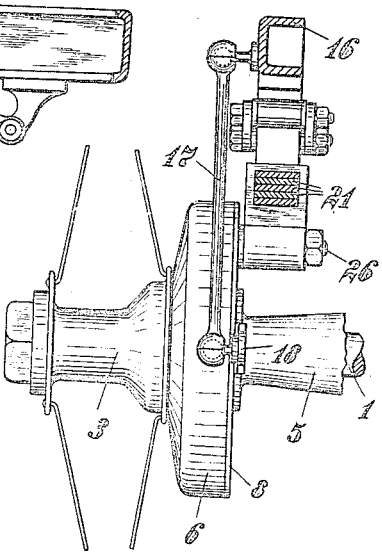
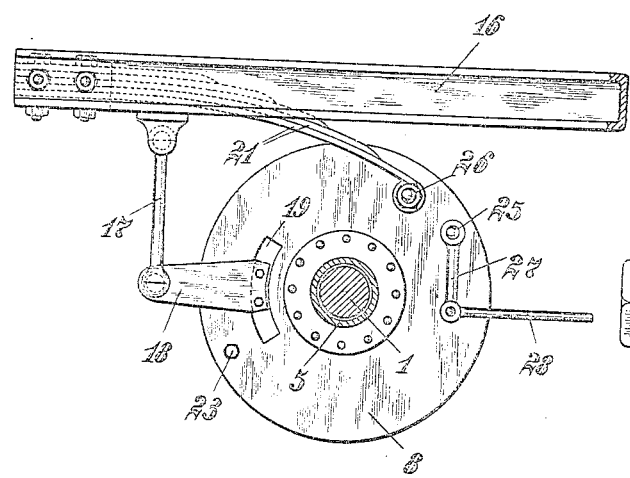
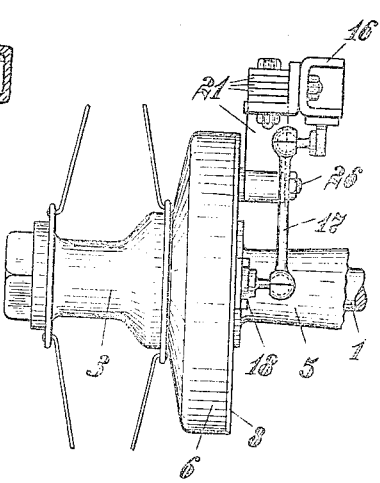
Witnesses
D. F. Schilling
Hermann Knorr
Inventor
Ettore Bugatti
by [signature]
his attorney

UNITED STATES PATENT OFFICE.

ETTORE BUGATTI, OF MOLSHEIM, GERMANY.

COMBINATION BRAKE AND SHOCK-ABSORBER.

1,117,972.  Specification of Letters Patent.  Patented Nov. 24, 1914.

Application filed June 1, 1914. Serial No. 842,203.

*To all whom it may concern:*

Be it known that I, ETTORE BUGATTI, a subject of the King of Italy, and residing at Molsheim, Alsace, German Empire, have invented certain new and useful Improvements in Combination Brakes and Shock-Absorbers, of which the following is a specification.

The present invention has reference to improvements in self propelled vehicles, and relates more specifically to a novel combination of shock absorber and brake, the former being built into the latter, and the invention essentially consists of the construction, arrangement and coöperation of parts, as will hereinafter be fully described with reference to the accompanying drawings, in which—

Figure 1:
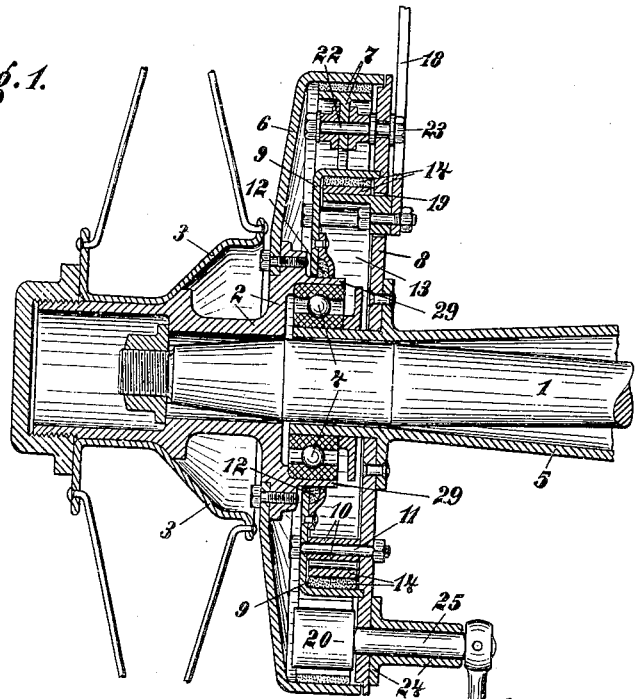
Figure 2:
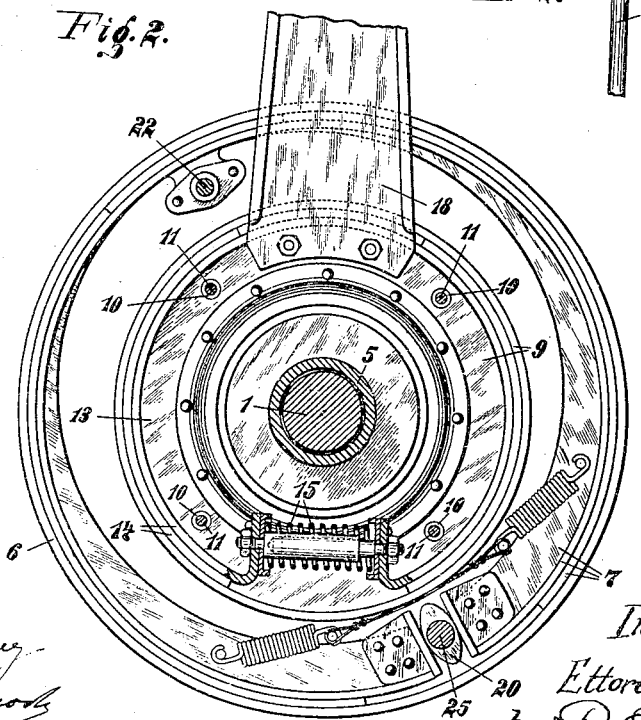

Figure 1 shows a longitudinal section through the combination device, with the brake cheek and toggle parts moved into the section plane for better illustration; Fig. 2 represents a rear elevation with the cover of the brake drum removed; and Figs. 3–6 represent rear and side elevations respectively of different ways of attaching the device to the respective chassis parts.

The rear vehicle axle 1 carries the hub 2, which may itself serve as wheel hub proper, or which may suitably support a special wheel hub 3, as shown by way of example in Fig. 1. This auxiliary hub 2 is rigidly secured to the live rear axle 1 and is rotatably journaled by means of the roller bearing 4 upon the dead rear wall tube 5 and supports the brake drum 6. Within the latter are situated the coöperating brake cheeks 7, 7 which for braking purposes are pressed in well known manner against the lining of the drum, for instance as shown by the operation of the toggle 20.

The drum is closed in front by the cover plate 8, supported on the dead rear axle, and to which is secured a casing or shell 9 by means of the pillars 10 and screw bolts 11, as shown in the lower part of Fig. 1 and in Fig. 2. The casing 9 extends into the brake drum and is completely hidden therein, and its vertical face is centrally apertured to receive the tubular extension 29 of the hub 2, which journals the roller bearing. A jointing 12 is provided to securely pack the parts 29 and 9, for the purpose of preventing egress of lubricating material from the roller bearing to the toggle brake parts, which would seriously interfere with proper braking operation. The shell 9, together with the cover plate 8, thus forms a chamber 13, into which enters the lubricant discharged from the roller bearing 4. In the chamber 13 is located a friction shock absorber or reducer 14, whose friction ring, under the influence of an expansion spring 15, is kept pressed against the wall of the casing 9. The operation of this shock absorber is effected through the agency of a rod 17, linked to the chassis 16, and whose lower end is pivoted to the arm 18, which latter extends into the chamber 13 through a slot 19 in the drum cover 8 and is rigidly secured to the friction ring of the shock reducer 14. Since the chamber 13 serves as collector for the lubricant discharged from the wheel bearing, the shock absorber obviously will always be suitably lubricated. The cover plate, furthermore, serves to support the brake cheeks 7, the toggle brake parts and the main suspension spring 21. The supporting bolt 22 for the brake cheeks 7 is secured by means of a screw or nut 23 (Fig. 1) to the cover plate 8; and the bushing 24 for the shaft 25 of the toggle 20, and the bolt 26 (Figs. 3–6) for the main suspension spring 21, are also suitably secured to the cover plate. The brake toggle 20, which in well known manner serves to operate the brake cheeks 7, is manipulated by means of the oscillating lever 27 and the connecting rod 28, linked thereto and operated by the vehicle driver. The cover plate thus serves five distinct purposes: being brake drum closure, shock absorber casing closure, brake cheeks carrier, brake toggle carrier, and chassis supporting spring carrier.

What I claim is:—

1. In an autovehicle, a combined brake and shock absorber, comprising a brake mechanism of the drum type, and a shock absorber located within said brake mechanism.

2. In an autovehicle, a combined brake and shock absorber, comprising a rotary brake drum, brake mechanism therein and a stationary cover therefor, a shell on said cover extending into said drum, and shock absorbing mechanism in said shell.

3. In an autovehicle, a combined brake and shock absorber, comprising a rotary brake drum, a stationary cover therefor, brake mechanism in said drum, supported on said cover and adapted to coöperate with said rotary drum, a shell secured to said cover and extending into said drum within said brake mechanism, packing means interposed between said drum and said shell for liquid-tightly separating these two parts, and shock absorbing mechanism in said shell.

4. In an autovehicle, in combination with the chassis and a dead and a live rear axle, a hub on the live axle, a roller bearing between said hub and said dead axle, a brake drum supported on said live axle, a slotted cover for said drum on said dead axle, brake mechanism supported on said stationary cover and adapted to coöperate with said rotary drum, means for actuating said brake mechanism, a shell secured to said cover and extending into said drum within said brake mechanism out of contact therewith, packing means between said hub and said shell, whereby an oil-tight chamber is presented within said drum, adapted to receive the waste lubricant from said roller bearing, a shock absorbing mechanism in said oil-tight chamber adapted to coöperate with said stationary shell, means for operating a member of said shock absorbing mechanism from without said shell through said cover slot, and spring suspension means interposed between said cover and said chassis.

In testimony whereof I affix my signature in presence of two witnesses.

ETTORE BUGATTI.

Witnesses:
JOSEPH ROHMER,
CHARLES A. HALLEY, Jr.